(12) United States Patent
Hoemke et al.

(10) Patent No.: US 10,436,345 B1
(45) Date of Patent: Oct. 8, 2019

(54) SIMPLIFIED MECHANISM FOR A SCOTCH YOKE ACTUATOR

(71) Applicants: Brian E. Hoemke, Rockford, IL (US); Joel W. Kleckler, Rockton, IL (US)

(72) Inventors: Brian E. Hoemke, Rockford, IL (US); Joel W. Kleckler, Rockton, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/986,671

(22) Filed: May 22, 2018

(51) Int. Cl.
*F16K 31/163* (2006.01)
*F16K 1/22* (2006.01)
*F16K 5/22* (2006.01)

(52) U.S. Cl.
CPC .......... *F16K 31/1635* (2013.01); *F16K 1/221* (2013.01); *F16K 5/227* (2013.01)

(58) Field of Classification Search
CPC ...... F16K 31/1635; F16K 5/227; F16K 1/221; F16K 31/163; F16K 31/16
USPC .................................................... 251/58, 229
See application file for complete search history.

(56) References Cited

U.S. PATENT DOCUMENTS

| | | | | |
|---|---|---|---|---|
| 1,517,728 A | * | 12/1924 | Heath | F16K 31/1635 251/58 |
| 3,261,266 A | * | 7/1966 | Hyman | F15B 15/06 251/31 |
| 3,704,986 A | * | 12/1972 | Sheesley | F15B 15/066 74/104 |
| 3,709,106 A | * | 1/1973 | Shafer | F01B 1/12 251/58 |
| 3,727,523 A | * | 4/1973 | Gulick | F03G 1/00 267/168 |
| 3,887,301 A | | 6/1975 | Henkel | |
| 4,265,132 A | * | 5/1981 | Robertson | F15B 15/066 74/104 |
| 4,651,627 A | | 3/1987 | Stewart | |
| 5,456,076 A | | 10/1995 | Zornes | |
| 5,546,897 A | | 8/1996 | Brackett | |

(Continued)

FOREIGN PATENT DOCUMENTS

EP 038972 11/1990
JP 2017026136 A 2/2017

(Continued)

*Primary Examiner* — John Bastianelli
(74) *Attorney, Agent, or Firm* — Reinhart Boerner Van Deuren P.C.

(57) ABSTRACT

An actuator converts linear motion into rotational motion. The actuator includes a power piston having a longitudinal axis. The power piston is configured to move back and forth along the longitudinal axis. A slider bearing is disposed within a cross-bore opening in the power piston. The cross-bore opening has a slider bearing axis orthogonal to the longitudinal axis. The slider bearing is configured to move back and forth within the cross-bore opening. An output shaft has a central axis orthogonal to both the longitudinal and the slider bearing axes. The output shaft includes an eccentric shaft pin inserted through a slot in the power piston and disposed within a cavity of the slider bearing. The eccentric shaft pin is offset from the central axis of the output shaft. The reciprocating movement of the power piston causes the slider bearing to move back and forth rotating the output shaft.

32 Claims, 13 Drawing Sheets

(56) References Cited

U.S. PATENT DOCUMENTS

| | | | |
|---|---|---|---|
| 5,601,110 A * | 2/1997 | Rembert | F15B 15/261 137/316 |
| 5,686,663 A * | 11/1997 | Spalding | B67D 7/18 73/247 |
| 7,258,086 B2 | 8/2007 | Fitzgerald | |
| 7,296,969 B2 | 11/2007 | Raes et al. | |
| 7,334,514 B2 | 2/2008 | Shu | |
| 7,698,991 B2 | 4/2010 | Sato et al. | |
| 8,347,708 B2 | 1/2013 | Hakansson et al. | |
| 8,353,207 B2 * | 1/2013 | Hakansson | G01F 3/18 73/247 |
| 9,372,662 B2 | 6/2016 | Hakansson et al. | |
| 2005/0166752 A1 | 8/2005 | Nomura | |
| 2008/0312025 A1 | 12/2008 | Spickard | |
| 2010/0288120 A1 | 11/2010 | Penning | |
| 2013/0118175 A1 | 5/2013 | Eisenmenger et al. | |
| 2013/0283762 A1 | 10/2013 | Simpson et al. | |
| 2016/0215889 A1 | 7/2016 | McAuliffe | |
| 2016/0341226 A1 | 11/2016 | Heverly et al. | |
| 2016/0363221 A1 | 12/2016 | Kamp et al. | |

FOREIGN PATENT DOCUMENTS

| | | |
|---|---|---|
| WO | WO 95/22027 A1 | 8/1995 |
| WO | WO 01/42695 A1 | 6/2001 |
| WO | WO 02/59502 | 8/2002 |
| WO | WO 2018/026437 | 2/2018 |

* cited by examiner

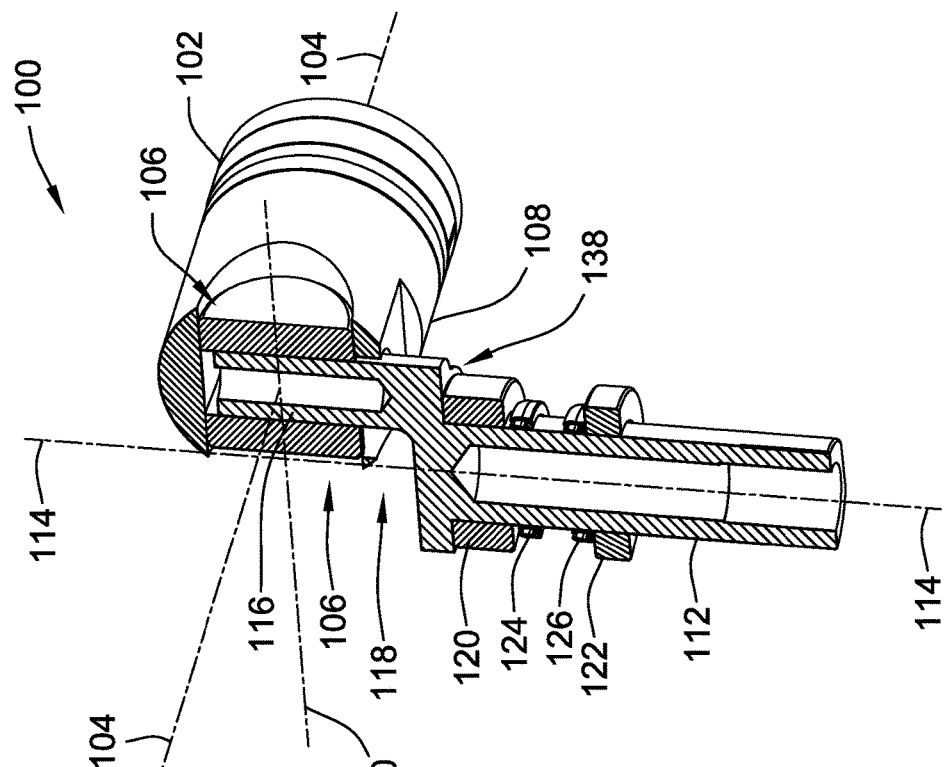
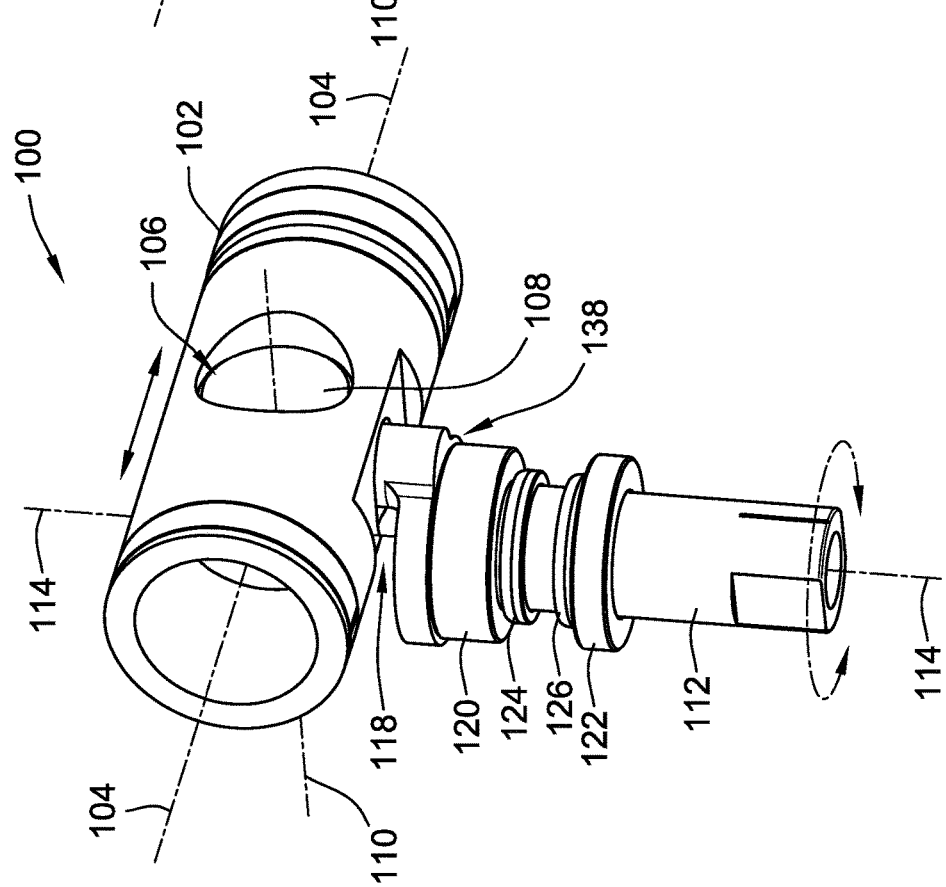

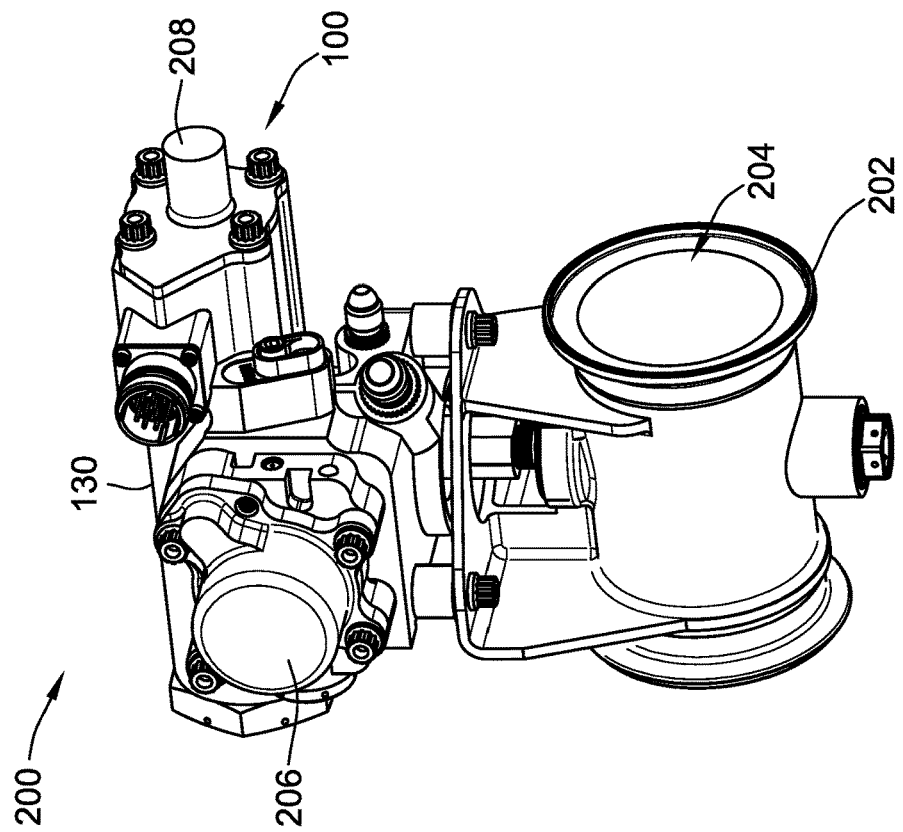
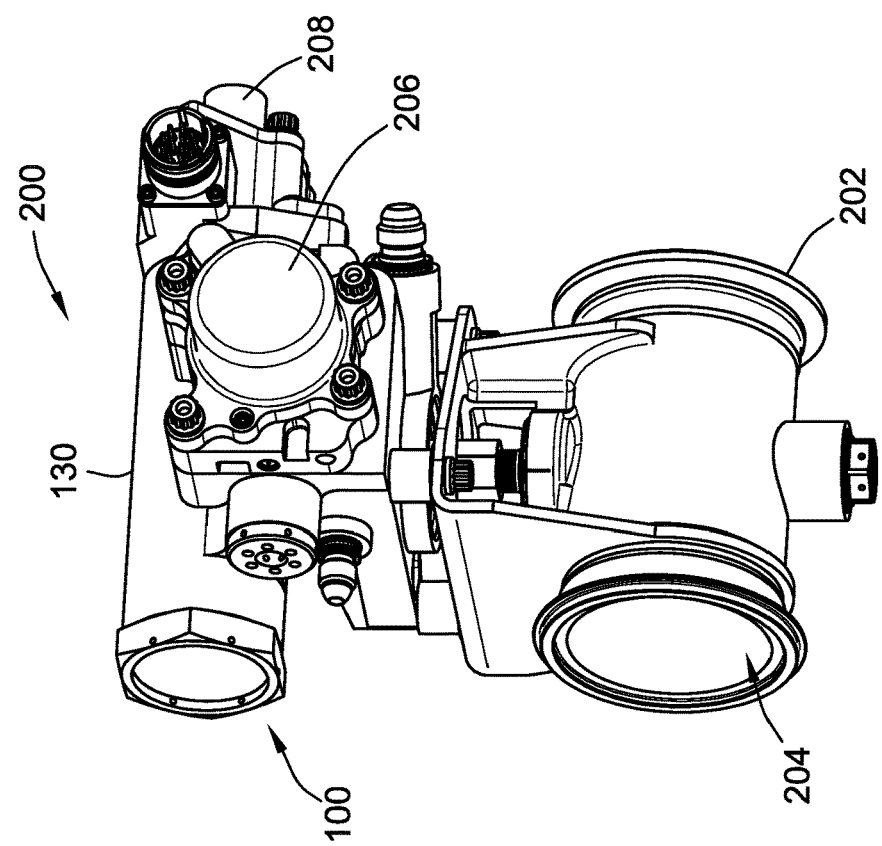
FIG. 4
FIG. 5

SIMPLIFIED MECHANISM FOR A SCOTCH YOKE ACTUATOR

FIELD OF THE INVENTION

This invention generally relates to air valve actuators for jet engines, and more particularly to Scotch Yoke Actuators.

BACKGROUND OF THE INVENTION

Jet engines employ air valves for a variety of reasons including, but not limited to, passenger compartment cooling, turbine clearance, and compressor bleed. Generally, these air valves require some type of rotary actuation. Different types of actuator mechanizations have been developed for these applications including, but not limited to, rotary vane actuators (RVA), linear crank sliders, Scotch yoke actuators, reverse Scotch yoke actuators, rotary piston actuators (RPA), and rack and pinion actuators.

The most common mechanism for converting linear force into rotational torque in air valves used on aircraft turbine engines is the linear crank slider. The linear crank slider has several disadvantages, chief among them: 1) Large overhanging mass due to length needed to implement the mechanization which adds to the size, weight, and cost of the system; 2) Linear seal and scraper at fluid/air boundary in harsh environment which adversely affect reliability; and 3) Linkage and associated bearings exposed to harsh environment which adversely affect reliability.

It would therefore be desirable to have an air valve actuation system that addresses the shortcoming recited above. Embodiments of the present invention provide such an air valve actuation system. These and other advantages of the invention, as well as additional inventive features, will be apparent from the description of the invention provided herein.

BRIEF SUMMARY OF THE INVENTION

In one aspect, embodiments of the invention provide an actuator for converting linear motion into rotational motion is provided. The actuator includes a cylinder having a longitudinal axis and a power piston configured to move in a reciprocating manner back and forth within the cylinder along the longitudinal axis. A slider bearing is disposed within a cross-bore opening in the power piston. The cross-bore opening has a slider bearing axis that is orthogonal to the longitudinal axis. The slider bearing is configured to move back and forth within the cross-bore opening. An output shaft has a central axis that is orthogonal to both the longitudinal axis and the slider bearing axis. The output shaft includes an eccentric shaft pin inserted through a slot in the power piston and disposed within a cavity of the slider bearing. The eccentric shaft pin is offset from the central axis of the output shaft. The reciprocating movement of the power piston causes the slider bearing to move back and forth rotating the output shaft.

In certain embodiments of the invention, the slider bearing is made from a self-lubricating material. The claimed actuator may also include a first radial bushing assembled onto the output shaft and adjacent an end of the output shaft which includes the eccentric shaft pin. In some embodiments, the first radial bushing is an annular radial bushing.

In other embodiments, the claimed actuator includes a first shaft seal assembled onto the output shaft to prevent a leakage of fluid from the cylinder to the output shaft. Moreover, the claimed actuator may further include a second radial bushing and second shaft seal each assembled onto the output shaft proximate the first radial bushing and first shaft seal. In a particular embodiment, the first shaft seal is an annular seal.

Further, in certain embodiments, the output shaft and eccentric shaft pin are monolithic being constructed as a single component. Additionally, the output shaft and eccentric shaft pin may include a gimbaling connection to accommodate deflection of the output shaft.

In another aspect, embodiments of the invention provide an air valve that includes a valve housing, and a moveable valve member disposed within the valve housing. The air valve also includes a valve actuator coupled to the valve member. The valve actuator includes a power piston having a longitudinal axis, the power piston configured to move in a reciprocating manner back and forth within the cylinder along the longitudinal axis. A slider bearing is disposed within a cross-bore opening in the power piston. The cross-bore opening has a slider bearing axis that is orthogonal to the longitudinal axis. The slider bearing is configured to move back and forth within the cross-bore opening. An output shaft has a central axis that is orthogonal to both the longitudinal axis and the slider bearing axis. The output shaft includes an eccentric shaft pin inserted through a slot in the power piston and disposed within a cavity of the slider bearing. The eccentric shaft pin is offset from the central axis of the output shaft. Also, the reciprocating movement of the power piston causes the slider bearing to move back and forth rotating the output shaft.

In a particular embodiment, the output shaft extends through the valve housing and controls a rotational movement of the valve member. In a more particular embodiment, the air valve is a butterfly valve, and the valve member is a disk which the output shaft rotates to control a flow of fluid through the valve housing. In an alternate embodiment, the air valve is a ball valve, and the valve member is a ball which the output shaft rotates to control a flow of fluid through the valve housing.

In certain embodiments, the air valve includes an electrohydraulic servo valve (EHSV) coupled to a cylinder which houses the power piston, the electrohydraulic servo valve configured to control linear movement of the power piston. In a more particular embodiment, the air valve includes a linear variable differential transformer disposed in the cylinder, the linear variable differential transformer configured to provide positional information for the power piston.

In some embodiments of the air valve, a first radial bushing is assembled onto the output shaft. The first radial bushing is adjacent an end of the output shaft which includes the eccentric shaft pin. An embodiment also includes a first shaft seal assembled onto the output shaft to prevent a leakage of fluid from the cylinder to the output shaft. Other embodiments include a second radial bushing and second shaft seal each assembled onto the output shaft proximate the first radial bushing and first shaft seal.

A further embodiment of the air valve includes a stepper motor having a rotor. A cam is operatively connected to the stepper motor. The cam position rotates in response to rotation of the rotor. The cam is disposed within a control valve body having an inlet port, a rod port, a head port and at least one drain port. A control piston is positioned within the control valve body and has a nozzle positioned on a first side of the cam in close proximity to a surface of the cam, and is movable between a null position and flow positions. The nozzle has a flow path leading from a first end of the control piston. The control piston further includes a means for applying a force on a second end of the control piston. The control piston moves as a result of a pressure imbalance at the ends of the control piston occurring in response to a change in position of the cam. An actuator piston is operably coupled to the cam. The actuator piston has a first side and a second side. The first side is in fluid communication with the head port and the second side is in fluid communication with the rod port. The cam moves in response to movement of the actuator piston. The actuator piston generates the reciprocating movement of the power piston which, in turn, causes the slider bearing to move back and forth rotating the output shaft.

Further embodiments of the air valve include those in which the cam is connected to a gear shaft which rotates the cam, the actuator further comprising a gearbox connected between the rotor and the gear shaft. In certain embodiments, the translation of the control piston opens one of the head port and rod port to supply and the other of the head port and rod to drain, thereby causing the actuator piston and rack to stroke, wherein translation of the control piston towards a first end of the control valve body opens the head port to supply and the rod port to drain, and wherein translation of the control piston towards a second end of the control valve body opens the head port to drain and the rod port to supply, and wherein the actuator piston rotates the cam and translates the control piston to a mechanical null position in response to the rack stroking.

In particular embodiments, the means for applying a force on a second end of the control piston is a spring in operative contact with the second end of the control piston, wherein the second end of the control piston is in fluid communication with the drain port. In other embodiments, the means for applying a force on a second end of the control piston is a double diameter end portion having an end thereof in fluid communication with the inlet port, and wherein a hydraulic pressure at the end of the double diameter varies in the same manner as a hydraulic pressure at the first end of the control piston.

In yet another aspect, embodiments of the invention provide an actuator for converting linear motion into rotational motion. The actuator includes a power piston configured to move in a reciprocating manner back and forth within the cylinder along a longitudinal axis. A slider bearing is disposed within a cross-bore opening in the power piston. The cross-bore opening has a slider bearing axis that is orthogonal to the longitudinal axis. The slider bearing is configured to move back and forth within the cross-bore opening. An output shaft has a central axis that is orthogonal to both the longitudinal axis and the slider bearing axis. The output shaft includes an eccentric shaft pin inserted through a slot in the power piston and disposed within a cavity of the slider bearing. The eccentric shaft pin is offset from the central axis of the output shaft. The actuator includes a stepper motor having a rotor. A cam is operatively connected to the stepper motor. The cam position rotates in response to rotation of the rotor. The cam is disposed within a control valve body having an inlet port, a rod port, a head port and at least one drain port. A control piston is positioned within the control valve body and has a nozzle positioned on a first side of the cam in close proximity to a surface of the cam, and is movable between a null position and flow positions. The nozzle has a flow path leading from a first end of the control piston. The control piston further includes a means for applying a force on a second end of the control piston. The control piston moves as a result of a pressure imbalance at the ends of the control piston occurring in response to a change in position of the cam. An actuator piston is operably coupled to the cam. The actuator piston has a first side and a second side. The first side is in fluid communication with the head port and the second side is in fluid communication with the rod port. The cam moves in response to movement of the actuator piston. The actuator piston generates the reciprocating movement of the power piston which, in turn, causes the slider bearing to move back and forth rotating the output shaft.

In a particular embodiment, the slider bearing is made from a self-lubricating material. In a further embodiment, the output shaft and eccentric shaft pin are monolithic being constructed as a single component, and wherein the output shaft and eccentric shaft pin include a gimbaling connection to accommodate deflection of the output shaft. Embodiments of the invention include those in which the cam is connected to a gear shaft which rotates the cam, the actuator further comprising a gearbox connected between the rotor and the gear shaft.

In a particular embodiment, the translation of the control piston opens one of the head port and rod port to supply and the other of the head port and rod to drain, thereby causing the actuator piston and rack to stroke. In a further embodiment, translation of the control piston towards a first end of the control valve body opens the head port to supply and the rod port to drain, and translation of the control piston towards a second end of the control valve body opens the head port to drain and the rod port to supply.

In some embodiments, the actuator piston rotates the cam and translates the control piston to a mechanical null position in response to the rack stroking. The means for applying a force on a second end of the control piston may include a spring in operative contact with the second end of the control piston, wherein the second end of the control piston is in fluid communication with the drain port. Alternatively, the means for applying a force on a second end of the control piston may include a double diameter end portion having an end thereof in fluid communication with the inlet port, and wherein a hydraulic pressure at the end of the double diameter varies in the same manner as a hydraulic pressure at the first end of the control piston.

Embodiments of stepper-motor-driven actuators are disclosed in U.S. Pat. No. 7,963,185, issued to Spickard. This patent reference is hereby incorporated in its entirety.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a perspective view of a portion of a scotch yoke actuator, constructed in accordance with an embodiment of the invention;

FIG. 2 is a perspective view of a scotch yoke actuator of FIG. 1 showing a cross-section of the scotch yoke actuator;

FIG. 4 is a perspective view of an air valve incorporating the scotch yoke actuator according to an embodiment of the invention;

FIG. 5 is another perspective view of the air valve of FIG. 4 incorporating the scotch yoke actuator;

Figure 3:
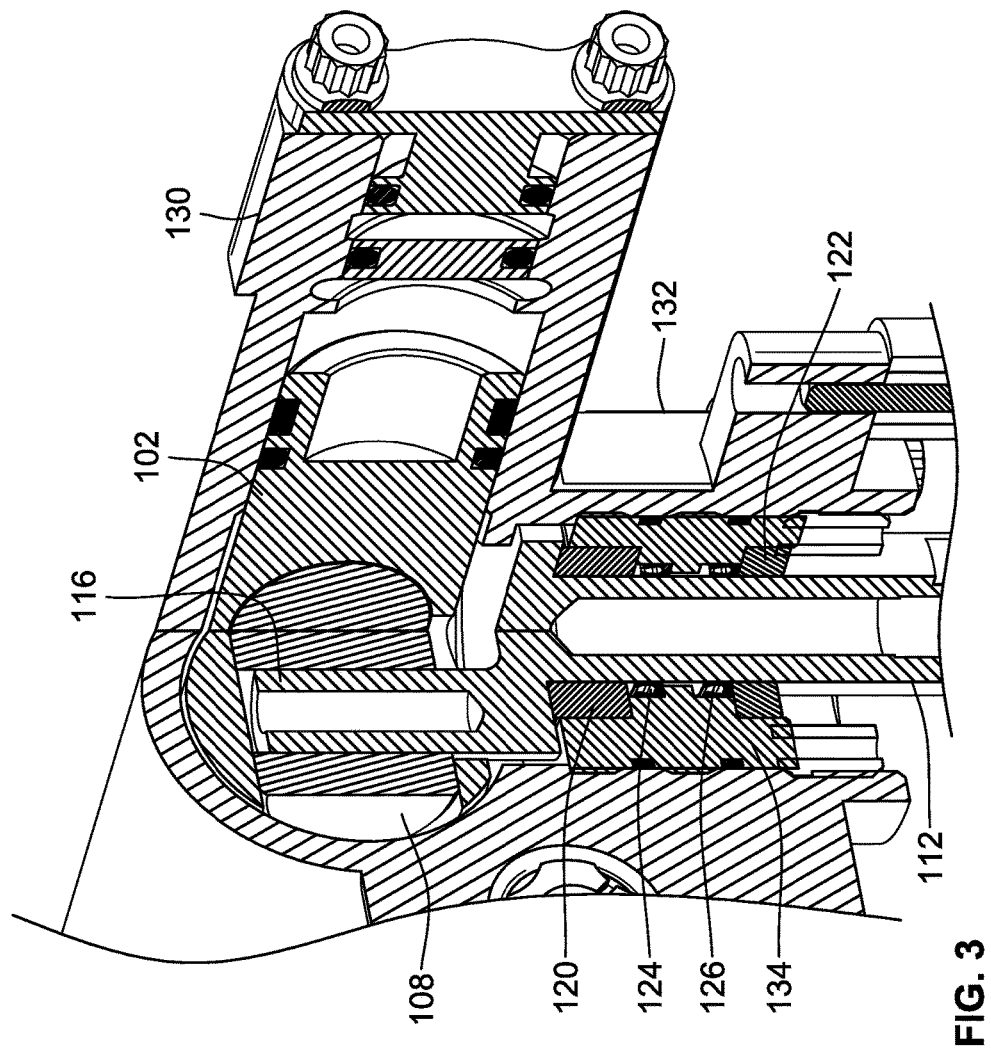
FIG. 3 is a perspective cut-away view of a scotch yoke actuator, constructed in accordance with an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 1 is a perspective view of a portion of a scotch yoke actuator 100, constructed in accordance with an embodiment of the invention. FIG. 2 is a perspective view of a scotch yoke actuator of FIG. 1 showing a cross-section of the scotch yoke actuator. The scotch yoke actuator 100 includes a power piston 102 configured to move linearly in a reciprocating motion in the direction shown by the arrow in FIG. 1. In the embodiments shown, the power piston 102 is cylindrical, though other piston configurations are envisioned. The power piston 102 has a longitudinal axis 104 and a cross-bore opening 106. Within the cross-bore opening 106, there is a slider bearing 108. The slider bearing 108 has a slider bearing axis 110. The slider bearing axis 110 is orthogonal to the longitudinal axis 104 of the power piston 102. In particular embodiments, the slider bearing 108 is made from a self-lubricating material.

In the embodiment of FIGS. 1 and 2, an output shaft 112 is positioned below the power piston 102 substantially at a right angle to the power piston 102. The output shaft 112 has a central axis 114 that is orthogonal to both the longitudinal axis 104 and the slider bearing axis 110. At one end of the output shaft 112, there is an eccentric shaft pin 116. The eccentric shaft pin 116 is offset from the central axis 114 positioned proximate an outer diameter of the output shaft 112. The eccentric shaft pin 116 extends through a slot 118 in the piston and further extends into a cavity of the slider bearing 108. In particular embodiments, the output shaft 112 and eccentric shaft pin 116 are monolithic, i.e., made from one continuous piece of material, for example by injection molding, casting, or by machining from a single piece of material.

In FIGS. 1 and 2 below the eccentric shaft pin 116 and assembled onto output shaft 112, there is a first radial bushing 120 and a second radial bushing 122. The two annular bushings 120, 122 are arranged on the output shaft 112 spaced some distance apart from each other along the output shaft 112. Between the two bushings 120, 122, there is a first shaft seal 124 and a second shaft seal 126 also spaced apart from each other along the output shaft 112. Like the bushings 120, 122, in the embodiment of FIGS. 1 and 2, the first shaft seal 124 and second shaft seal 126 are annular.

FIG. 3 is a perspective cut-away view of the scotch yoke actuator 100 (see FIGS. 1 and 2) that includes an enclosed cylinder 130 which houses the power piston 102, and a shaft housing 132 that houses output shaft 112. In certain embodiments of the invention, the cylinder 130 is configured to hold hydraulic fluid which is used to move the power piston 102 linearly in a reciprocating manner within the cylinder 130. As shown in FIG. 3, the output shaft 112 is supported within the shaft housing 132 by the first radial bushing 120 and the second radial bushing 122. The first radial bushing 120, second radial bushing 122, first shaft seal 124, and second shaft seal 126 are surrounded by an output shaft bearing 134.

FIGS. 4 and 5 show different perspective views of an air valve 200 incorporating the scotch yoke actuator 100 of FIGS. 1-3 according to an embodiment of the invention. The air valve 200 includes a valve body 202 and a valve member 204, the location of the valve member 204 is indicated, but not explicitly shown, in the illustrations of FIGS. 4 and 5. However, one of ordinary skill in the art will be able to see how the air valve 200 functions. In a typical embodiment, the valve is a ball valve and the valve member will be a ball of the type typically used in a ball valve, or the valve is a butterfly valve and the valve member will be a disk of the type typically used in a butterfly valve.

Movement of the valve member 204 is controlled by the scotch yoke actuator 100. An electrohydraulic servo valve 206 is coupled to the cylinder 130 such that the electrohydraulic servo valve 206 controls the position of the power piston 102 within the cylinder 130 by controlling a flow of hydraulic fluid into and out of the cylinder 130. In particular embodiments, the air valve also includes a position sensor 208, such as a linear variable differential transformer, to determine the position of the power piston 102 within the cylinder 130.

In operation, the electrohydraulic servo valve 206 provides a flow of hydraulic fluid into the cylinder 130 to move the piston linearly back and forth in a reciprocating manner within cylinder 130. As the power piston 102 moves back and forth, the eccentric pin 116 on output shaft 112 rotates. This rotation is made possible by the slider bearing 108 which slides back and forth in a direction transverse to the movement of the power piston 102. As can be seen from FIGS. 1 and 2, the simultaneous linear movement of the power piston 102 and slider bearing 108 allows the eccentric shaft pin 116 to move in a circular motion to rotate the output shaft 112. The rotating output shaft 112 controls the position of the valve member 204 either directly, as will be described below and illustrated in FIGS. 6A and 6B, or indirectly by connecting to the valve member 204 via a linkage mechanism as in the embodiment of FIGS. 4 and 5.

Figure 6A:
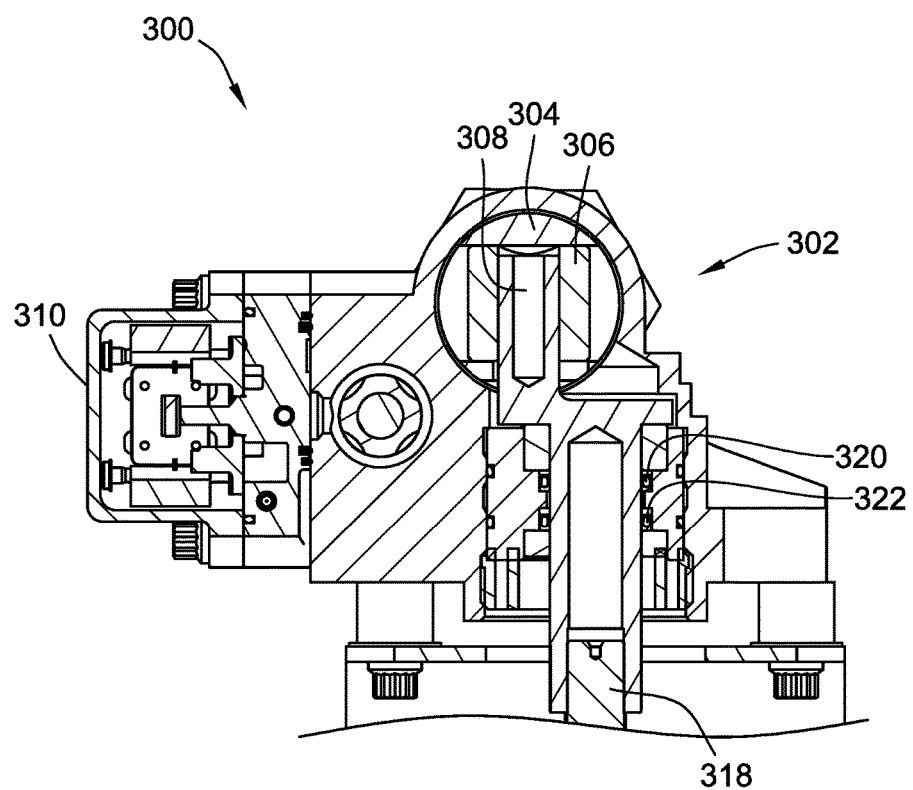
FIGS. 6A and 6B show alternate embodiments of an air valve incorporating the scotch yoke actuator, according to an embodiment of the invention.
Figure 6B:
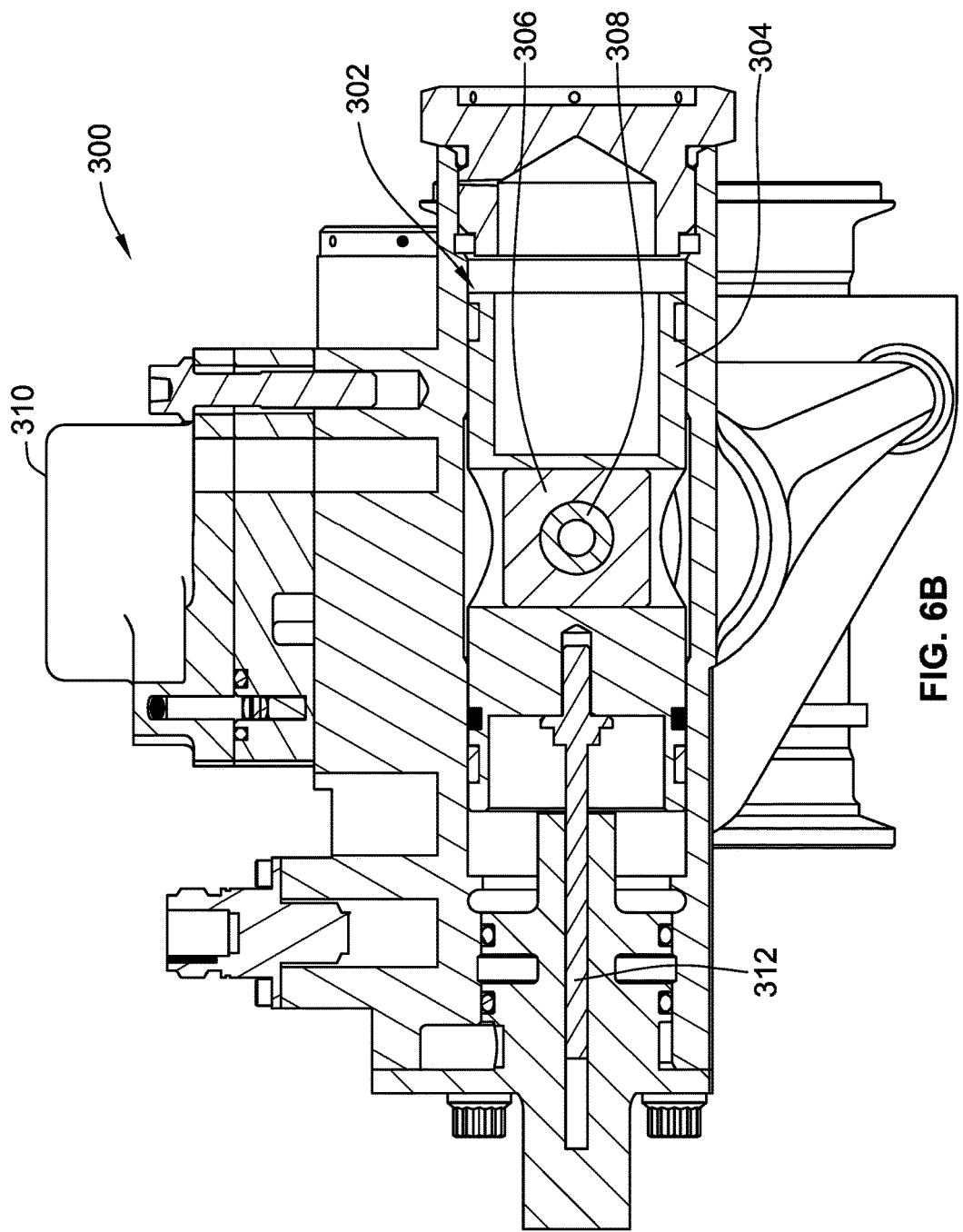

FIGS. 6A and 6B show a plan view and top view for an alternate embodiment of an air valve 300 incorporating a scotch yoke actuator 302 according to an embodiment of the invention. The scotch yoke actuator 302 includes piston 304, slider bearing 306, and eccentric shaft pin 308. The air valve 300 further includes electrohydraulic servo valve 310 with position sensor 312, which may be a linear variable differential transformer.

In an exemplary embodiment, the air valve 300 of FIGS. 6A and 6B employs a butterfly valve, however, this configuration could be used with a number of other types of valves. As such, the specific valve is not shown in FIG. 6A, as the claimed scotch yoke actuator 302 could operate a range of valve types. However, one of ordinary skill will readily understand how the exemplary butterfly valve, for example with a butterfly plate disposed within a valve housing, would be incorporated with the scotch yoke actuator 302 shown. The scotch yoke actuator 302 operates to rotate the eccentric shaft pin 308, which is coupled to an integral output shaft 318, which, in the exemplary embodiment, directly controls the position of the butterfly plate to regulate the flow of air through the valve housing. A first shaft seal 320 and second shaft seal 322 are assembled onto the integral output shaft 318. In the embodiment of FIGS. 6A and 6B, a first shaft bearing 324 is assembled onto the integral output shaft 318 between the first and second shaft seals 320, 322.

The embodiments of the scotch yoke actuator 100, 300 as described above and shown in FIGS. 1-6B address several of the problems associated with linear crank sliders. As referenced above, some of the problems solved by the present invention include elimination of the large overhanging mass typically associated with linear crank sliders. As such, the scotch yoke actuator of the present invention is lighter and more compact than convention actuators.

Linear crank sliders typically incorporate a linear seal with a scraper at the hydraulic fluid/air boundary. These seals become worn and possibly damaged due to the repetitive wiping motion of the seal along the piston cylinder. Solid impurities in the hydraulic fluid can increase the damage to these seals if the impurities get between the seal and the wiping surface. As such, the seals must be frequently replaced or fluid leakage can occur. The annular seals 120, 122 used in the present invention do not undergo the same wiping motion as seals used in linear crank sliders, and the annular seals 120, 122 are not located at the hydraulic fluid/air boundary and are thus less likely to encounter solid impurities. Instead, the annular seals 120, 122 of the present invention are subjected to the rotation of the output shaft 112, which is less harsh than the wiping motion seen by linear crank slider seals.

The monolithic, one-piece construction of the output shaft 112 and eccentric shaft pin 116 provides a more reliable, less expensive solution than linear crank sliders with respect to the conversion of linear motion to rotational motion. Also, the self-lubricating property of the slider bearing minimizes wear and increases reliability. In particular embodiments of the invention, a gimbaling connection, as described above, allows for reliable operation of the actuator even when the shaft is deflected from its normal orthogonal position with respect to the piston and cylinder.

Figure 7:
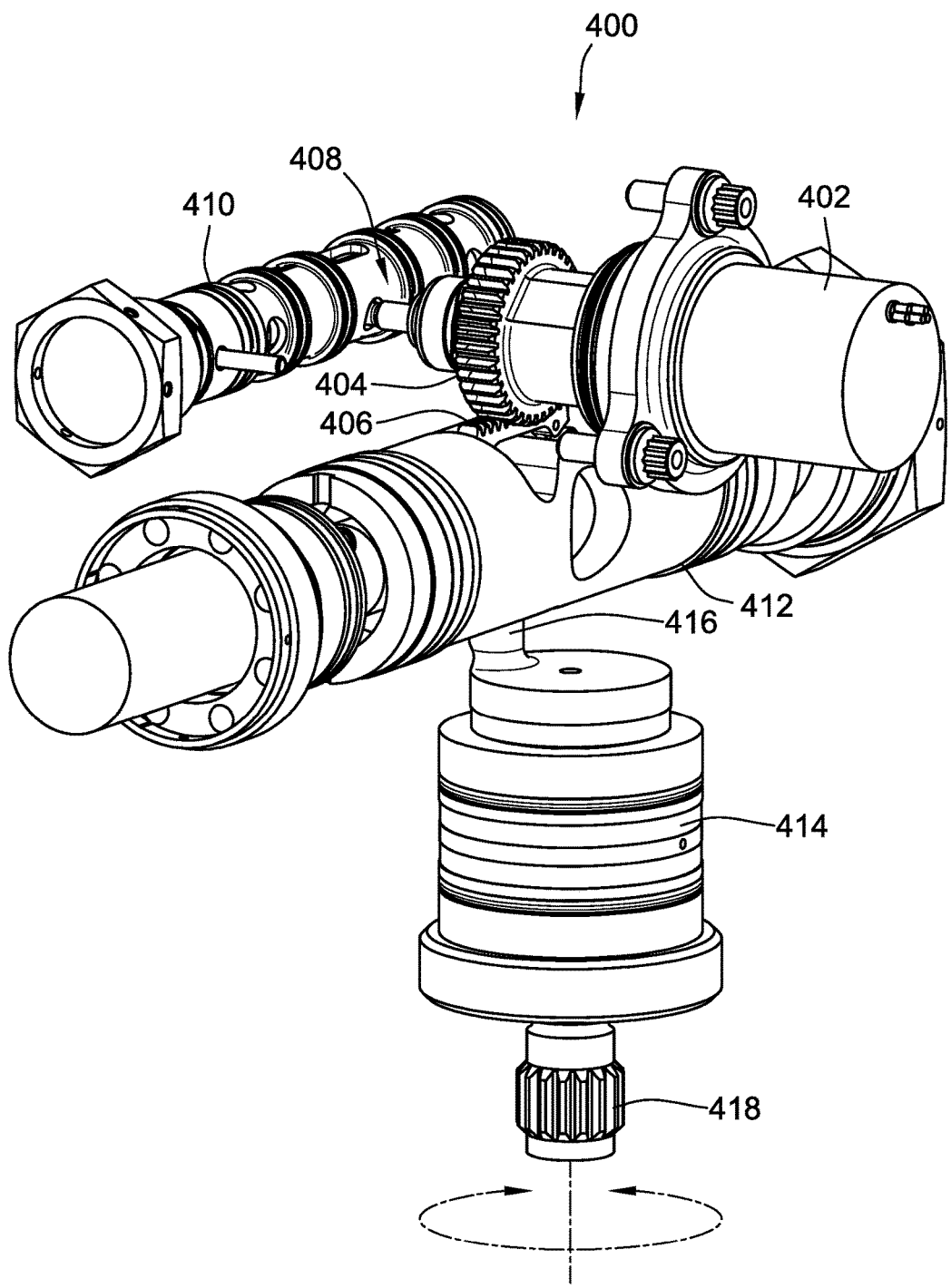
FIG. 7 is a perspective view of a stepper-motor-driven scotch yoke actuator, according to an embodiment of the invention.

The perspective view of FIG. 7 shows an alternate embodiment of the invention that includes a stepper-motor-driven scotch yoke actuator 400. The stepper-motor-driven scotch yoke actuator 400 eliminates the need for a position sensor and position feedback. The hydraulic amplification that is typically provided, for example by an electrohydraulic servo valve (EHSV) flapper valve, is eliminated and replaced with a constant gain cam-nozzle amplification-tracking system. The combination of the cam-nozzle, stepper motor, and a gearbox in communication with the rack of the actuator piston provides an accurate and robust actuation positioning system. One feature of this embodiment is that it can provide a "fail-fixed" system, that is, a system that maintains its last commanded position in the event of electrical power failure.

In the embodiment of FIG. 7, the stepper-motor-driven scotch yoke actuator 400 includes a stepper motor 402. As will be shown below, the stepper motor 402 has an output shaft with a pinion gear coupled to a plurality of planetary gears, which are in turn coupled to a ring gear 404. The ring gear 404 is coupled to a rack 406. An output shaft 408 of the planetary gears is coupled to a cam disposed inside of a first cylinder 410. The cam is used to position a control piston, the workings of which will be described in more detail below.

The rack 406 is disposed on a surface of a second cylinder 412 which houses the power piston 102 with cross-bore opening 106, and slider bearing 108 (see FIGS. 1-3) for the stepper-motor-driven scotch yoke actuator 400. An output shaft 414 includes an eccentric pin 416 which is inserted through a slot in the second cylinder 412 and into the cavity of the slider bearing 108 (see FIGS. 1-3). As described in the embodiments above, the output shaft 414 rotates to control a valve member for an air valve. Thus, in some embodiments, the bottom end 418 of the output shaft 414 is coupled to a valve body 202 and a valve member 204, as shown in FIGS. 4 and 5. In particular embodiments, the valve may be a ball valve or butterfly valve, but is not limited to these valve types.

Figure 8:
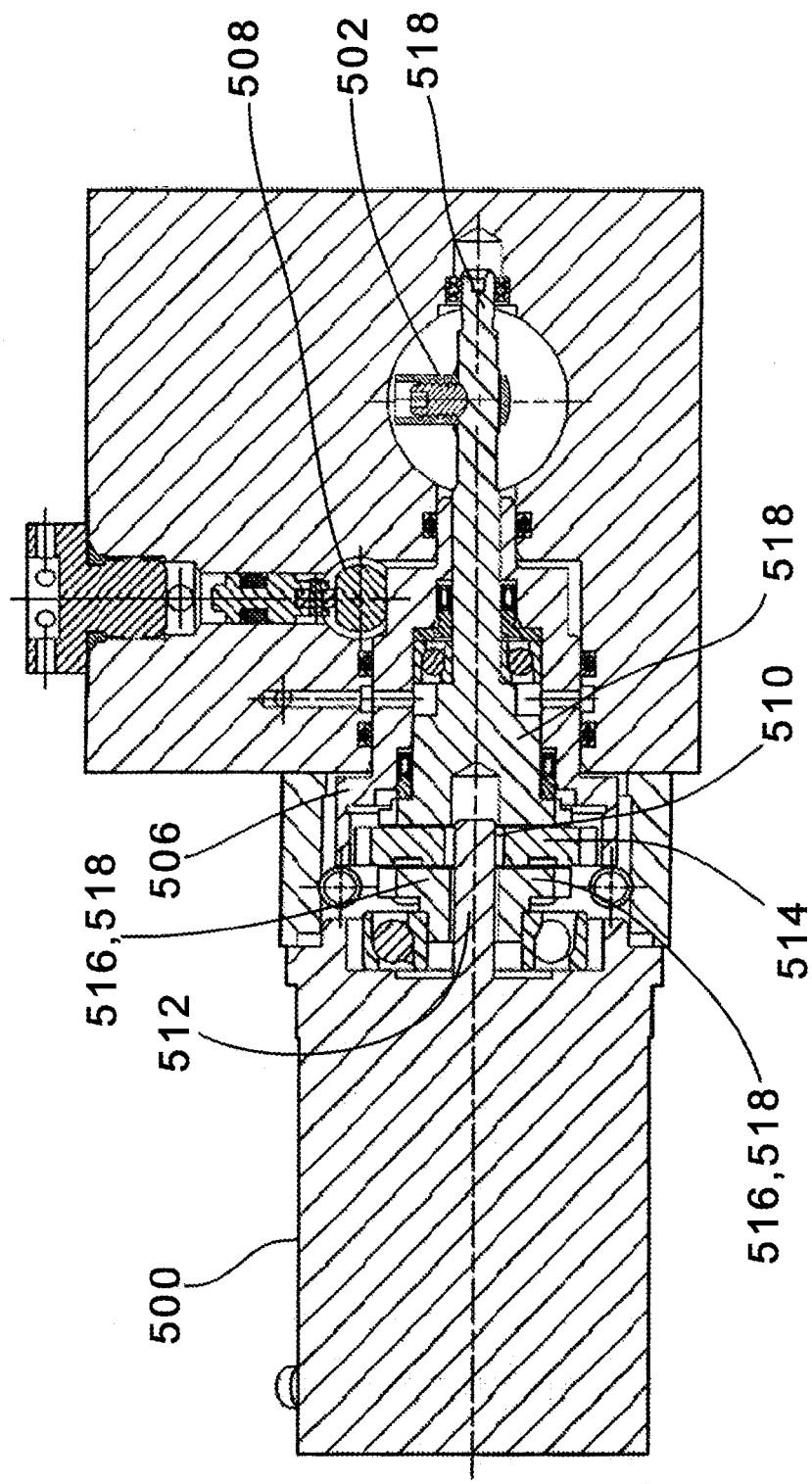
FIG. 8 is a cross-sectional view of the actuator system in accordance with the teachings of the present invention.
Figure 9:
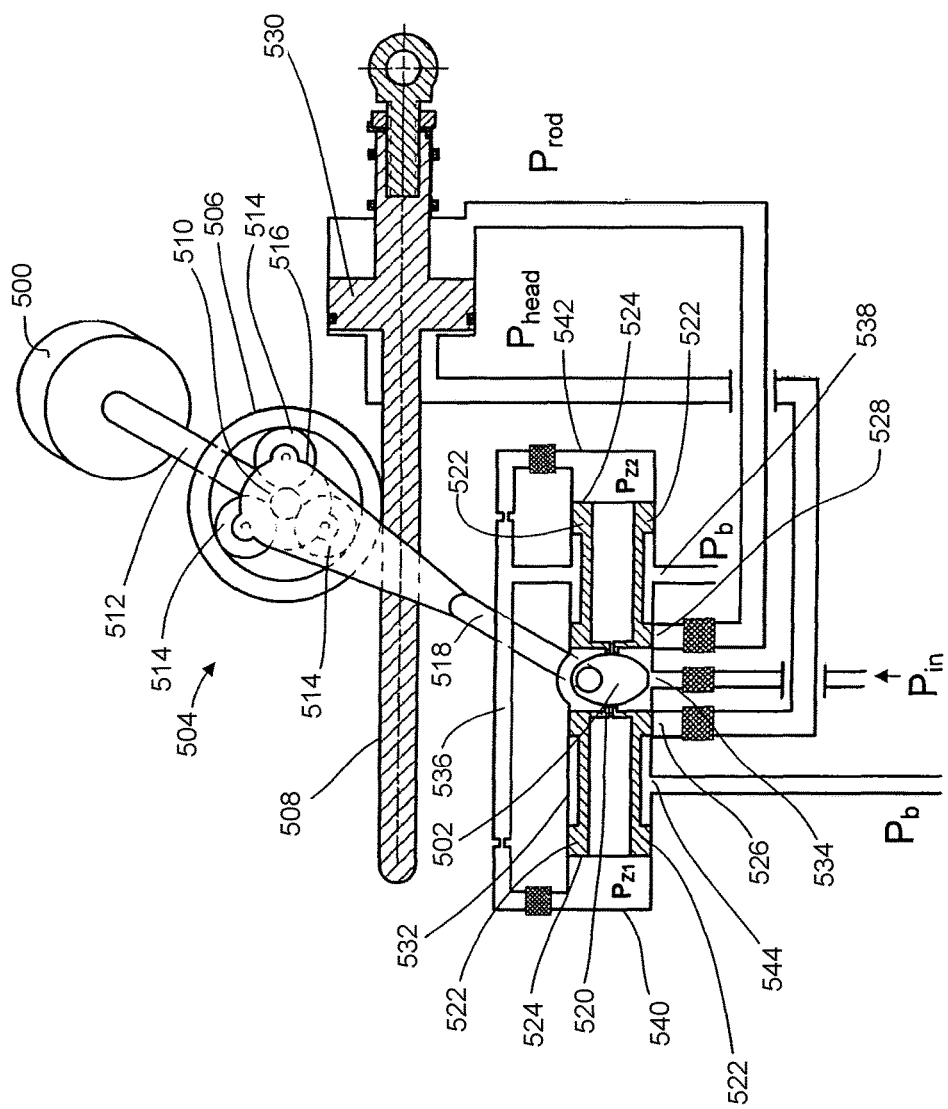
FIG. 9 is a partial cross-sectional view of the actuator system of FIG. 8 with the stepper motor shown as a separate component for clarity and the control piston at a centered position.
Figure 10:
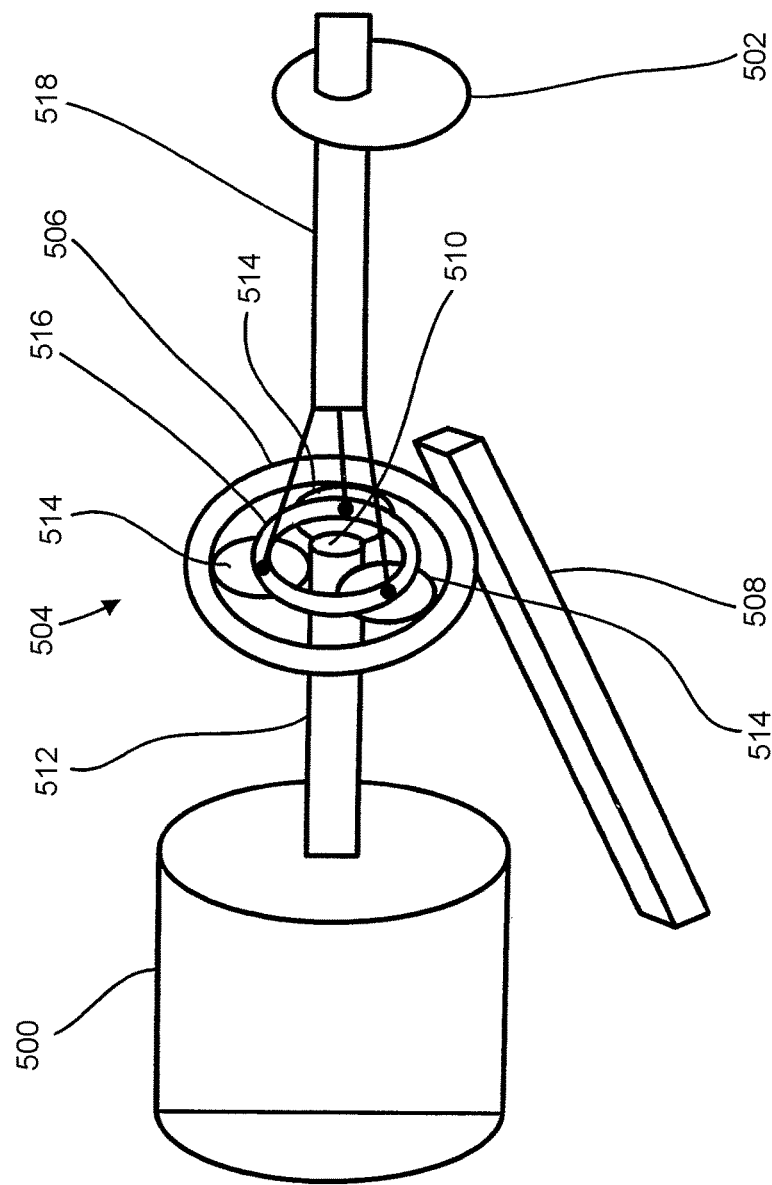
FIG. 10 is a schematic view of the actuator system of FIG. 9 illustrating the cam-rack interaction.

FIGS. 8-14 provide a detailed view of exemplary embodiments of the stepper-motor-driven actuation system. With reference to FIGS. 8 to 10, a stepper motor 500 is used to drive cam 502. The stepper motor drives a planetary gear system 504 where the ring gear 506 is in mesh relation to rack 508. The pinion gear 510 is integral to the stepper motor rotor 512. When the stepper motor 500 is rotated, the pinion gear 510 rotates. The pinion gear 510 rotation caused the planet gears 514 and planet frame 516 to rotate. The output shaft 518 is attached to the planet frame 516 and rotates with it. Similarly, the cam 502 that is attached to the output shaft 518 rotates with the output shaft 518.

The cam rotation increases the gap between the cam 502 and nozzle 520 on one side of the cam 502 and decreases the gap between the cam 502 and nozzle 520 on the other side. The differences in the gaps affect the Pz1 and Pz2 pressures on the ends 524 of the control piston 522 so as to force the control piston 522 in the direction that will re-equalize the cam-nozzle gaps. The control piston translation opens the head port 526 and rod port 528 to supply or drain, thereby causing the actuator piston 530 and rack 508 to stroke. The rack 508 provides direct actuator position feedback to the ring gear 506, causing the ring gear 506 to rotate. The ring gear rotation causes the planet gears 514 and planet frame 516 to rotate back to their original position, thereby rotating the cam and translating the control piston 522 to the mechanical null position (i.e., the center position).

When the cam 502 is in the center position, the hydraulic flow will enter port 534, pass through the cam-nozzle-orifice system (i.e., around cam 502 and through nozzles 520 and corresponding orifices), enter line 536, and then drain out through Pb port 538 due to the lower pressure in the Pb drain. It should be noted that the direction of flow is from line 534 and into the nozzles 520 via the cam-nozzle gap (i.e., "flow in") as compared to conventional valves where flow is from the piston ends 524 out of the nozzle 520 (i.e., "flow out").

Figure 11:
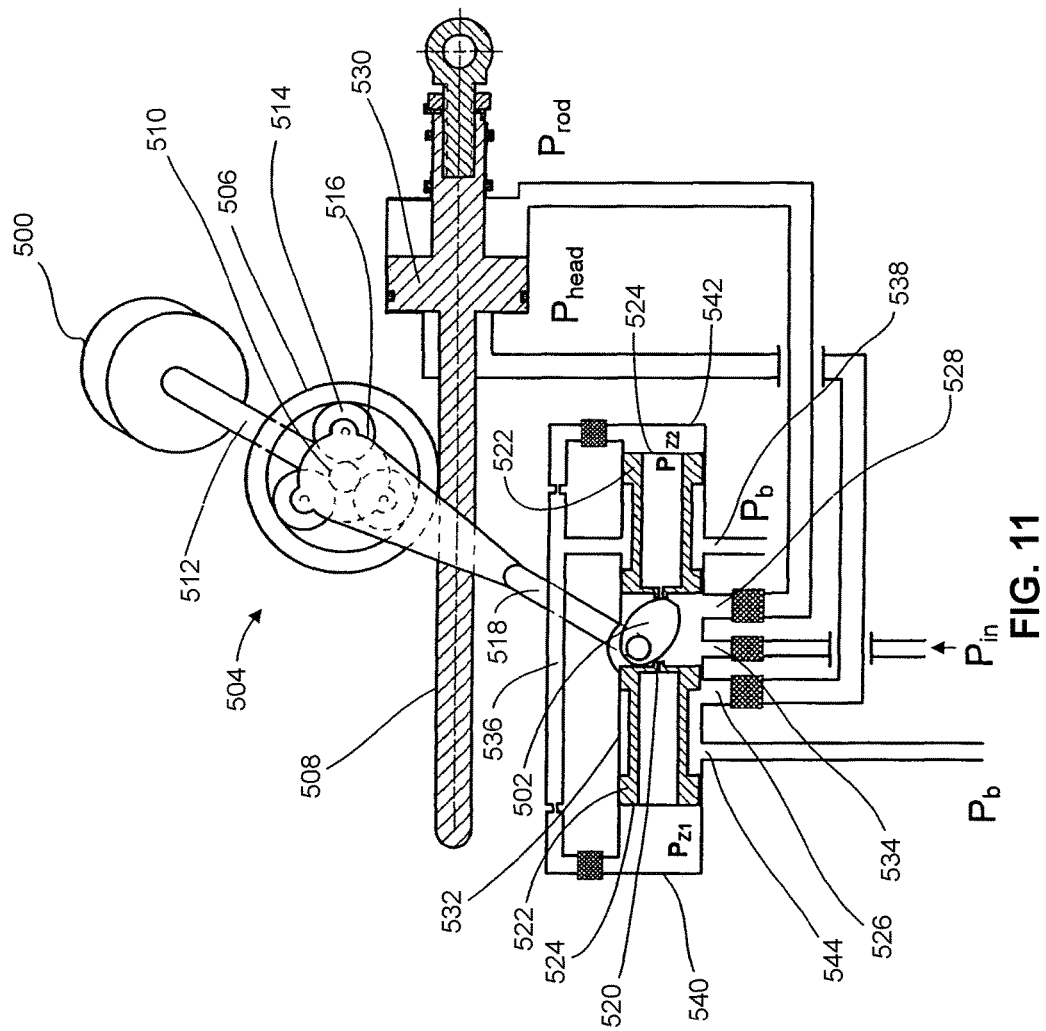
FIG. 11 is a partial cross-sectional view of the actuator system of FIG. 9 with the control piston at a position such that flow drives the actuator in the retract direction with the actuator against the retract stop.
Figure 12:
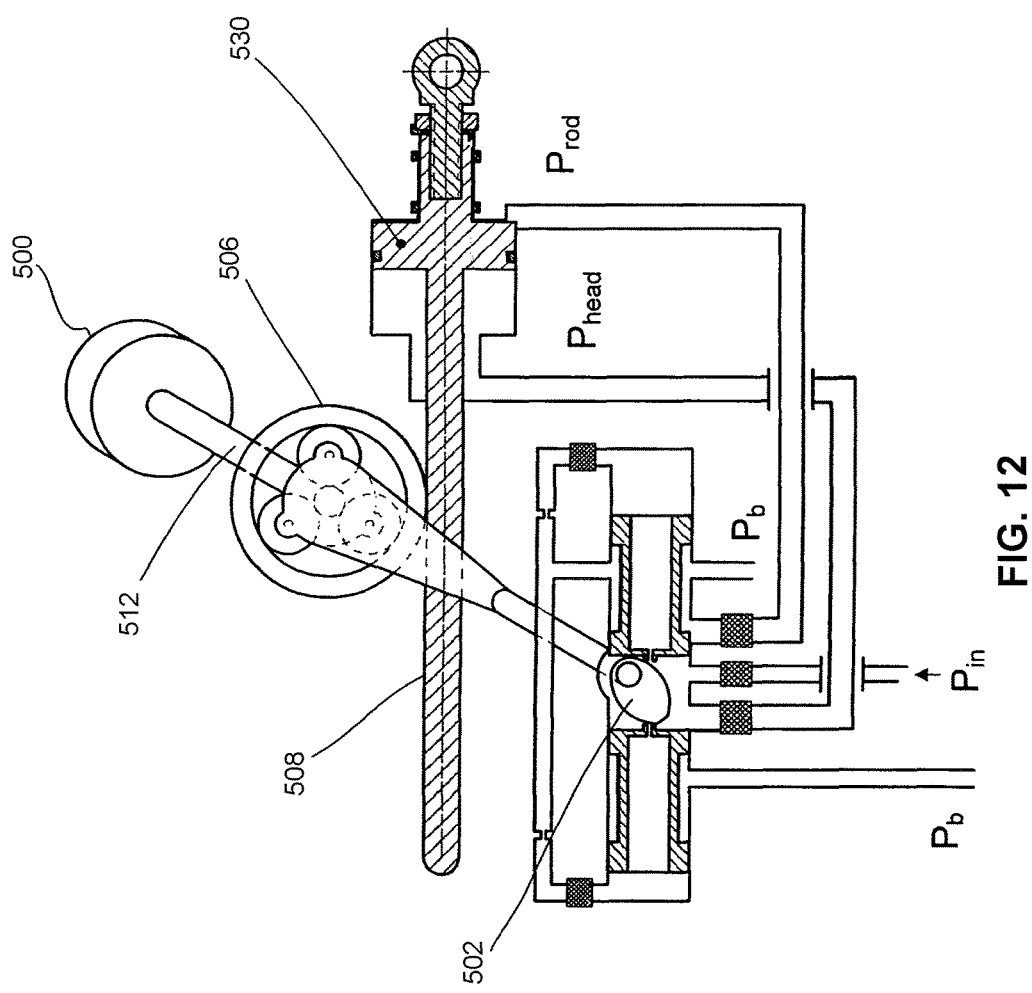
FIG. 12 is a partial cross-sectional view of the actuator system of FIG. 2 with the control piston at a position such that flow drives the actuator in the extend direction with the actuator against the extend stop.

Note that when the cam 502 is positioned such that the control piston 522 is towards the left-most position 540 in the control valve body 532, the supply port 534 is opened to the head port 526 (see FIG. 12). When this occurs, the hydraulic flow passes through port 534, out through head port 526 and returns through rod port 528 and discharges out through Pb port 538. When the cam 502 is positioned such that the control piston 522 is towards the right-most position 542 in the control valve body 532, the supply port 534 is opened to the rod port 528 (see FIG. 11). The hydraulic flow passes through port 534, out through rod port 528 and returns through head port 526 and discharges out Pb port 544.

During normal operation with a properly sized hydraulic and electromechanical system, it is unlikely that the control piston 522 will be at either its left-most position 540 or its right-most position 542 (as respectively shown in FIGS. 12 and 11) due to the response of the system. In FIG. 11, the hydraulics are driving the actuator in the retract direction but it is against the retract stop. FIG. 12 depicts the hydraulics driving the actuator in the extend direction but the actuator is against the extend stop.

Generally, as the stepper motor 500 rotates the cam 502, the control piston 522 begins to move and flow enters into either the head port 526 or the rod port 528. As the control piston 522 continues to move due to rotation of the cam 502, the port through which flow enters (i.e., head port 526 or rod port 528) opens wider, thus increasing the flow. As the flow pushes actuator piston 530, the rod 508 moves, thus rotating the ring gear 506 as described above. The rotation of the ring gear 506 by rod 508 results in the cam 502 and control piston 522 translating to the mechanical null position, thus preventing further flow to the actuator. The result is a proportional tracking of the actuator piston 530 to the motor rotor 512. As long as the dynamics of the system are sufficient fast so as to keep up with the input from the motor 500, the actuator 530 will track the motor 500 commands with relatively small transient rotations of shaft 518, cam 502 and translations of control piston 522.

The primary disturbance to the system is the force input to the actuator. Any movement of the actuator piston 530 will cause rack 508 translation and ring gear 506 rotation. Any ring gear movement results in cam 502 rotation due to the precision gearbox system 504. The high pressure gain of the system assures control piston 522 movement for any cam 502 rotation. The high pressure gain of the control valve ports 526 & 528 coupled with the large head/rod areas will result in the required resistive force with minimal position error.

The stepper motor 500 and accompanying components described above couple a relatively low-energy motor with relatively high-energy hydraulics. Combining the stepper motor 500 with a suitable gearbox 504 provides the capability to decrease stepper motor speed and increase its torque while staying at the same energy level. This is accomplished by proper selection of the motor stator, rotor tooth count, and gearbox ratio. These components can be used to increase the motor torque, decrease it's susceptibility to torque disturbances, and still keep the motor fast enough to handle dynamic operation. Generally, the stepper motor 500 has nearly perfect gain and is essentially unaffected by torque disturbances due to higher torque capability, gear box torque amplification, and the inherent detent feature of the stepper motor. In the embodiment shown, the round, symmetrical, balanced construction of the stepper motor 500 is in essence unaffected by vibration and temperature variations.

The precision machined placement of stator and rotor teeth provide the inherent baseline position and gain accuracy of the stepper motor 500. If an accurate calibration is made, and the effects of disturbances are negated, the need for a sensor is eliminated. This accuracy does not change with life, is essentially constant from unit to unit, and is not a function of any calibration procedure. In certain embodiments, the round, symmetric construction of the stepper motor 500 maintains this accuracy in the presence of environment variations (e.g., temperature). Torque disturbances at the output shaft 518 such as dynamic seal friction, nozzle hydraulic loads, unbalanced cam mass, etc. are minimal and are essentially rejected by the precision gearbox 504 (comprising pinion gear 510, ring gear 506, planetary gears 514, and planet frame 516) and the high detent torque of the stepper motor 500.

The detent torque prevents disturbances from having any appreciable effect until they reach such a magnitude that they completely overpower the stepper motor 500. In particular embodiments, the stepper motor rotor rides on precision ball bearings and is inherently precision-balanced about its rotation axis in the presence of translational accelerations (i.e., vibration), so the torque disturbances at the motor rotor are negligible. The stepper motor 500 has no channel-channel tracking error due to the fact that both channels share the same rotor-stator-pole flux circuit. Power transients have no effect on steady-state operation, and the precision gearbox has minimal backlash. In one embodiment, the backlash of the gearbox 504 is approximately two step increments of the stepper motor 500.

Figure 13:
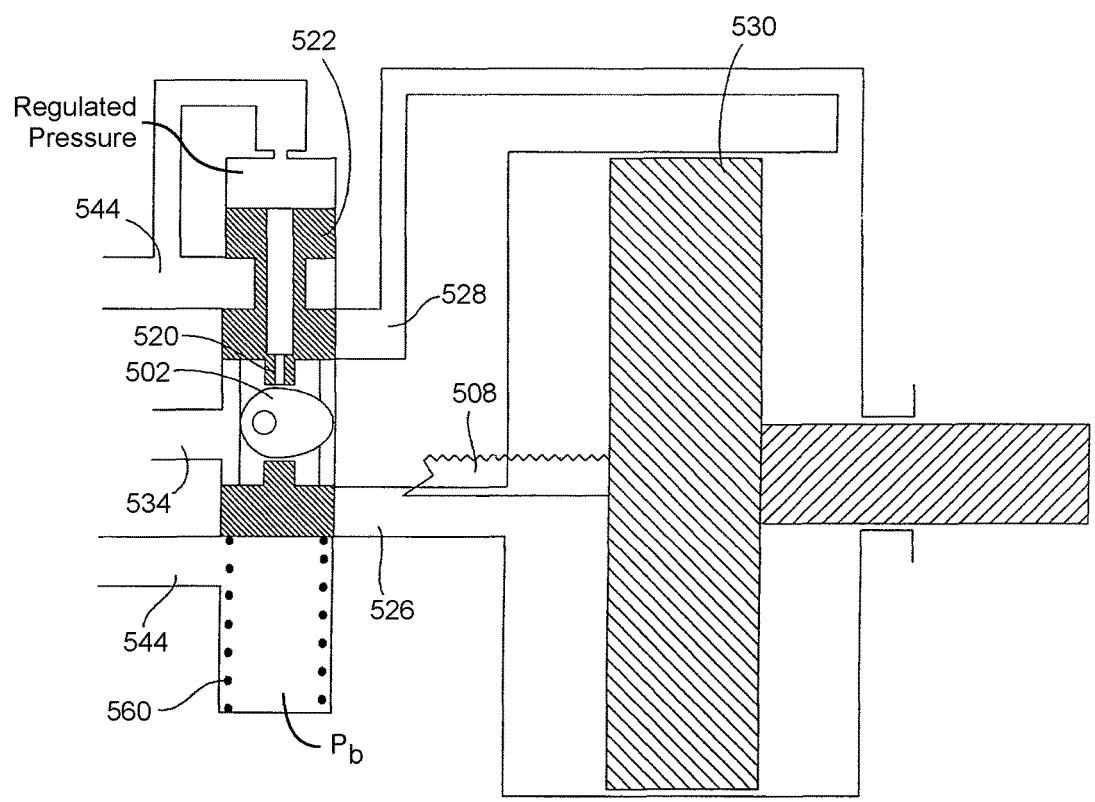
FIG. 13 is a partial cross-sectional view of a single nozzle embodiment of the actuator system constructed in accordance with the teachings of the present invention.
Figure 14:
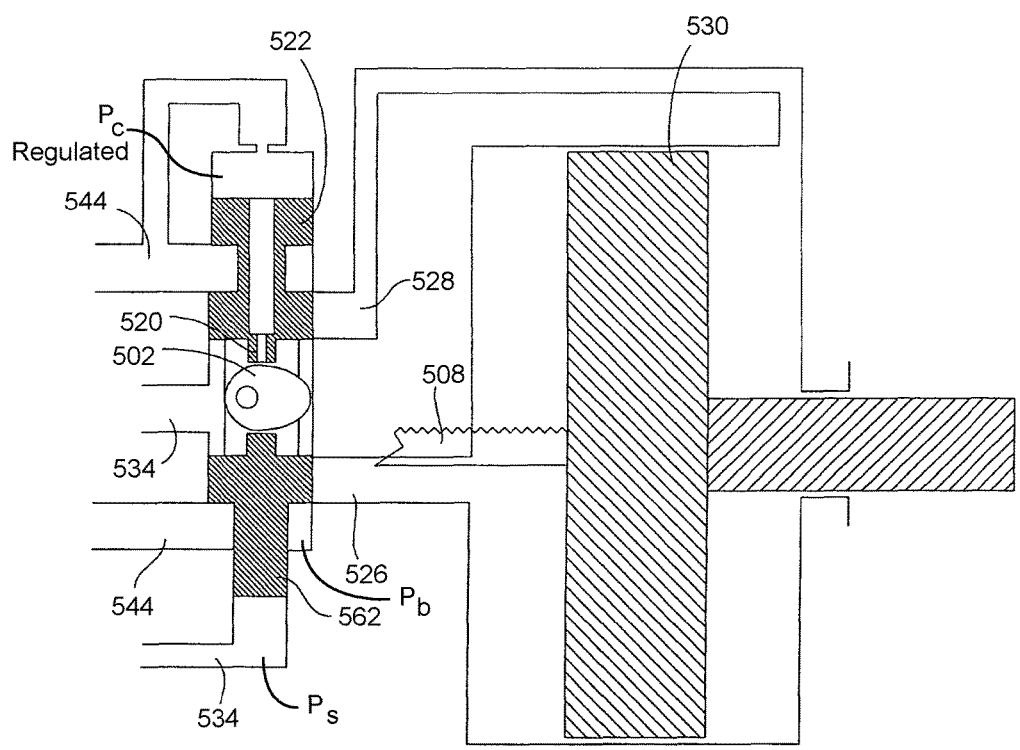
FIG. 14 is a partial cross-sectional view of another single nozzle embodiment of the actuator system constructed in accordance with the teachings of the present invention.

With a thorough understanding of the two-nozzle embodiment firmly in hand, attention is now directed to FIGS. 13 and 14 which depict single-nozzle embodiments of the present invention. Each of these single-nozzle embodiments operate similar to the two nozzle embodiments discussed above and reduce cost over the two nozzle embodiments discussed above, albeit at the expense of a reduced force gain and force margin. Each embodiment utilizes a means for applying force on one end of the control piston 522. Specifically, FIG. 13 illustrates an embodiment wherein the means is a spring preload with a constant pressure (Pb). FIG. 14 depicts a single-nozzle embodiment that does not include a spring preload, but instead utilizes a double-diameter end portion with a supply pressure on one diameter and pressure Pb on the other diameter.

With regard to the embodiment of FIG. 13, a spring 560 provides a preload on the control piston 522, e.g. a 10 lb. preload in one embodiment. Those skilled in the art will recognize that other preload forces may be provided depending on the operating parameters and conditions of the particular installation, and therefore all such preloads are to be included herein. This load is balanced by a Pz1-induced force existing at the opposite end of the control piston 522. Pz1 is regulated between the pressure at port 534 (Pc) and the pressure at port 544 (Pb) as a function of the cam 502 and the nozzle gap. In the presence of a constant spring force (spring scale is neglected) and constant Pc-Pb pressure, the fluid gap between the cam 502 and the nozzle 520 is constant. This assures that the piston position is a function of cam position, and only cam position.

In the single-nozzle embodiment depicted in FIG. 14, the spring preload is replaced by a hydraulic load via a double-diameter end portion 562. The double-diameter end portion 562 is desirable in that its hydraulic force varies with Ps (at port 534)-Pb (at port 544) in the same manner that the Pz1 force does on the opposite end of the control piston 522. This trait ensures that the cam-nozzle gap stays constant in the presence of a varying Ps-Pb, which ensures that the piston position 522 is a function of the cam 502, and only the cam 502.

As can be seen from the foregoing, a robust stepper-motor-driven proportional actuator has been described. Robustness, as used herein, refers to the ability of the system to remain accurate in the presence of disturbance inputs and environment variations. Disturbances lead to a shift in the entire step-versus-position plot and gain variations lead to changes in the slope of the plot. Disturbances are due to undesired torques and forces as well as imperfect calibration. Gain variations are due to the change in output/input characteristics due to component life and environment. Robustness is obtained by embodiments of the invention by minimizing the magnitude of disturbances where possible, by isolating the device from disturbances where necessary, by maximizing the disturbance rejection characteristics of the device, by designing a device with minimal wear and/or whose performance is unaffected by wear, by precision calibration, and by inherent gain accuracy in the presence of environment variations (e.g., temperature, stray flux, vibration, pressures, etc.).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An actuator for converting linear motion into rotational motion, the actuator mechanism comprising:

a cylinder having a longitudinal axis and a power piston disposed in the cylinder, the power piston configured to move in a reciprocating manner back and forth within the cylinder along the longitudinal axis;

a slider bearing disposed within a cross-bore opening in the power piston, the cross-bore opening having a slider bearing axis that is orthogonal to the longitudinal axis, the slider bearing configured to move back and forth within the cross-bore opening;

an output shaft having a central axis that is orthogonal to both the longitudinal axis and the slider bearing axis, the output shaft including an eccentric shaft pin inserted through a slot in the power piston and disposed within a cavity of the slider bearing, the eccentric shaft pin being offset from the central axis of the output shaft;

wherein the reciprocating movement of the power piston causes the slider bearing to move back and forth rotating the output shaft.

2. The actuator of claim 1, wherein the slider bearing is made from a self-lubricating material.

3. The actuator of claim 1, further comprising a first radial bushing assembled onto the output shaft and adjacent an end of the output shaft which includes the eccentric shaft pin.

4. The actuator of claim 3, wherein the first radial bushing is an annular radial bushing.

5. The actuator of claim 3, further comprising a first shaft seal assembled onto the output shaft to prevent a leakage of fluid from the cylinder to the output shaft.

6. The actuator of claim 5, further comprising a second radial bushing and second shaft seal each assembled onto the output shaft proximate the first radial bushing and first shaft seal.

7. The actuator of claim 5, wherein the first shaft seal is an annular seal.

8. The actuator of claim 1, wherein the output shaft and eccentric shaft pin are monolithic being constructed as a single component.

9. An actuator for converting linear motion into rotational motion, the actuator comprising:

a power piston having a longitudinal axis, the power piston configured to move in a reciprocating manner back and forth along the longitudinal axis;

a slider bearing disposed within a cross-bore opening in the power piston, the cross-bore opening having a slider bearing axis that is orthogonal to the longitudinal axis, the slider bearing configured to move back and forth within the cross-bore opening;

an output shaft having a central axis that is orthogonal to both the longitudinal axis and the slider bearing axis, the output shaft including an eccentric shaft pin inserted through a slot in the power piston and disposed within a cavity of the slider bearing, the eccentric shaft pin being offset from the central axis of the output shaft;

a stepper motor having a rotor;

a cam operatively connected to the stepper motor, the cam position rotating in response to rotation of the rotor, the cam disposed within a control valve body having an inlet port, a rod port, a head port and at least one drain port;

a control piston positioned within the control valve body and having a nozzle positioned on a first side of the cam in close proximity to a surface of the cam and movable between a null position and flow positions, the nozzle having a flow path leading from a first end of the control piston, the control piston further including a means for applying a force on a second end of the control piston, the control piston moving as a result of a pressure imbalance at the ends of the control piston occurring in response to a change in position of the cam;
an actuator piston that is operably coupled to the cam, the actuator piston having a first side and a second side, the first side being in fluid communication with the head port and the second side being in fluid communication with the rod port, the cam moving in response to movement of the actuator piston;
wherein the actuator piston generates the reciprocating movement of the power piston which, in turn, causes the slider bearing to move back and forth rotating the output shaft.

10. The actuator of claim 9, wherein the slider bearing is made from a self-lubricating material.

11. The actuator of claim 9, wherein the output shaft and eccentric shaft pin are monolithic being constructed as a single component.

12. The actuator of claim 9, wherein the cam is connected to a gear shaft which rotates the cam, the actuator further comprising a gearbox connected between the rotor and the gear shaft.

13. The actuator of claim 9, wherein the translation of the control piston opens one of the head port and rod port to supply and the other of the head port and rod to drain, thereby causing the actuator piston and rack to stroke.

14. The actuator of claim 13, wherein translation of the control piston towards a first end of the control valve body opens the head port to supply and the rod port to drain, and wherein translation of the control piston towards a second end of the control valve body opens the head port to drain and the rod port to supply.

15. The actuator of claim 13, wherein the actuator piston rotates the cam and translates the control piston to a mechanical null position in response to the rack stroking.

16. The actuator of claim 9, wherein the means for applying a force on a second end of the control piston comprises a spring in operative contact with the second end of the control piston, wherein the second end of the control piston is in fluid communication with the drain port.

17. The actuator of claim 9, wherein the means for applying a force on a second end of the control piston comprises a double diameter end portion having an end thereof in fluid communication with the inlet port, and wherein a hydraulic pressure at the end of the double diameter varies in the same manner as a hydraulic pressure at the first end of the control piston.

18. An air valve comprising:
a valve housing;
a moveable valve member disposed within the valve housing;
a valve actuator coupled to the valve member, the valve actuator comprising:
    a power piston having a longitudinal axis, the power piston configured to move in a reciprocating manner back and forth along the longitudinal axis;
    a slider bearing disposed within a cross-bore opening in the power piston, the cross-bore opening having a slider bearing axis that is orthogonal to the longitudinal axis, the slider bearing configured to move back and forth within the cross-bore opening;
    an output shaft having a central axis that is orthogonal to both the longitudinal axis and the slider bearing axis, the output shaft including an eccentric shaft pin inserted through a slot in the power piston and disposed within a cavity of the slider bearing, the eccentric shaft pin being offset from the central axis of the output shaft;
    wherein the reciprocating movement of the power piston causes the slider bearing to move back and forth rotating the output shaft.

19. The air valve of claim 18, wherein the output shaft extends through the valve housing and controls a rotational movement of the valve member.

20. The air valve of claim 19, wherein the air valve is a butterfly valve, and the valve member is a disk which the output shaft rotates to control a flow of fluid through the valve housing.

21. The air valve of claim 19, wherein the air valve is a ball valve, and the valve member is a ball which the output shaft rotates to control a flow of fluid through the valve housing.

22. The air valve of claim 18, further comprising an electrohydraulic servo valve coupled to a cylinder which houses the power piston, the electrohydraulic servo valve configured to control linear movement of the power piston.

23. The air valve of claim 22, further comprising a linear variable differential transformer disposed in the cylinder, the linear variable differential transformer configured to provide positional information for the power piston.

24. The air valve of claim 22, further comprising a first radial bushing assembled onto the output shaft and adjacent an end of the output shaft which includes the eccentric shaft pin.

25. The air valve of claim 24, further comprising a first shaft seal assembled onto the output shaft to prevent a leakage of fluid from the cylinder to the output shaft.

26. The air valve of claim 25, further comprising a second radial bushing and second shaft seal each assembled onto the output shaft proximate the first radial bushing and first shaft seal.

27. The air valve of claim 18, wherein the slider bearing is made from a self-lubricating material.

28. The air valve of claim 18, wherein the output shaft and eccentric shaft pin are monolithic, being constructed as a single component.

29. The air valve of claim 18, further comprising:
a stepper motor having a rotor;
a cam operatively connected to the stepper motor, the cam position rotating in response to rotation of the rotor, the cam disposed within a control valve body having an inlet port, a rod port, a head port and at least one drain port;
a control piston positioned within the control valve body and having a nozzle positioned on a first side of the cam in close proximity to a surface of the cam and movable between a null position and flow positions, the nozzle having a flow path leading from a first end of the control piston, the control piston further including a means for applying a force on a second end of the control piston, the control piston moving as a result of a pressure imbalance at the ends of the control piston occurring in response to a change in position of the cam;
an actuator piston that is operably coupled to the cam, the actuator piston having a first side and a second side, the first side being in fluid communication with the head port and the second side being in fluid communication with the rod port, the cam moving in response to movement of the actuator piston;

wherein the actuator piston generates the reciprocating movement of the power piston which, in turn, causes the slider bearing to move back and forth rotating the output shaft.

30. The actuator of claim 29, wherein the cam is connected to a gear shaft which rotates the cam, the actuator further comprising a gearbox connected between the rotor and the gear shaft.

31. The actuator of claim 29, wherein the translation of the control piston opens one of the head port and rod port to supply and the other of the head port and rod to drain, thereby causing the actuator piston and rack to stroke, wherein translation of the control piston towards a first end of the control valve body opens the head port to supply and the rod port to drain, and wherein translation of the control piston towards a second end of the control valve body opens the head port to drain and the rod port to supply, and wherein the actuator piston rotates the cam and translates the control piston to a mechanical null position in response to the rack stroking.

32. The actuator of claim 29, wherein the means for applying a force on a second end of the control piston comprises one of:
- a spring in operative contact with the second end of the control piston, wherein the second end of the control piston is in fluid communication with the drain port; and
- a double diameter end portion having an end thereof in fluid communication with the inlet port, and wherein a hydraulic pressure at the end of the double diameter varies in the same manner as a hydraulic pressure at the first end of the control piston.

* * * * *